US008283634B2

(12) United States Patent
Legras (10) Patent No.: US 8,283,634 B2
(45) Date of Patent: Oct. 9, 2012

(54) DEVICE FOR DETECTING ELECTROMAGNETIC RADIATION

(75) Inventor: Olivier Legras, Voiron (FR)

(73) Assignee: Ulis, Veurey Voroize (FR)

( * ) Notice: Subject to any disclaimer, the term of this patent is extended or adjusted under 35 U.S.C. 154(b) by 244 days.

(21) Appl. No.: 12/647,027

(22) Filed: Dec. 24, 2009

(65) Prior Publication Data
US 2010/0176298 A1  Jul. 15, 2010

(30) Foreign Application Priority Data

Jan. 15, 2009  (FR) ...................................... 09 50193

(51) Int. Cl.
*G01J 5/00* (2006.01)
(52) U.S. Cl. ................. 250/338.3; 250/338.1; 250/336.1
(58) Field of Classification Search ............... 250/338.3, 250/338.1, 336.1
See application file for complete search history.

(56) References Cited

U.S. PATENT DOCUMENTS

| 6,791,610 | B1 | 9/2004 | Butler et al. | |
|---|---|---|---|---|
| 6,953,932 | B2* | 10/2005 | Anderson et al. | .......... 250/338.1 |
| 2002/0074499 | A1 | 6/2002 | Butler | |
| 2003/0160171 | A1 | 8/2003 | Parrish et al. | |
| 2010/0016988 | A1* | 1/2010 | Stack et al. | ................. 623/23.65 |
| 2010/0065729 | A1* | 3/2010 | Legras et al. | ............... 250/252.1 |
| 2010/0116988 | A1* | 5/2010 | Hannebauer | ............... 250/338.4 |
| 2010/0181458 | A1* | 7/2010 | Liu | .............................. 248/363 |
| 2011/0068272 | A1* | 3/2011 | Dupont et al. | ............. 250/338.4 |
| 2011/0180710 | A1* | 7/2011 | Bluzer | ........................ 250/338.4 |
| 2011/0186737 | A1* | 8/2011 | Crastes | ...................... 250/338.4 |

OTHER PUBLICATIONS

Yutaka Tanaka et al., "Performance of 320×240 Uncooled Bolometer-Type Infrared Focal Plane Arrays," Infrared Technology and Applications XXIX, Proceedings of SPIE, vol. 5074, Oct. 2003, pp. 414-424.

* cited by examiner

Primary Examiner — Christine Sung
(74) Attorney, Agent, or Firm — Burr & Brown (57) ABSTRACT

The invention relates to a device for detecting electromagnetic radiation comprising: a resistive bolometer, a biasing circuit capable of biasing said bolometer with a predetermined bias voltage, a rejection module capable of generating a common mode current, a measuring circuit capable of being connected to a bolometer and a rejection module in order to measure the difference between the current flowing through the bolometer when it is biased and the common mode current generated by the rejection module. According to the invention, rejection module comprises: a module for estimating a current that flows through resistive bolometer when it is subjected to the bias voltage and made insensitive to the electromagnetic radiation; and a current generator which is controlled by the estimation module and generates the current estimated by the latter as a common mode current.

12 Claims, 4 Drawing Sheets

Fig. 1
PRIOR ART

PRIOR ART

DEVICE FOR DETECTING ELECTROMAGNETIC RADIATION

FIELD OF THE INVENTION

The present invention relates to the field of imaging and infrared pyrometry.

More especially, the invention relates to common mode rejection when bolometers are read out.

BACKGROUND OF THE INVENTION

In the field of infrared detectors, the use of devices configured in the form of an array and capable of operating at ambient temperature, i.e. not requiring cooling to extremely low temperatures, is known—in contrast to detecting devices referred to as "quantic detectors" which can only operate at extremely low temperatures, typically that of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector generally includes:
means of absorbing the infrared radiation and converting it into heat,
means of thermally isolating the detector so that its temperature can rise due to the effect of the infrared radiation,
thermometric means which, in the context of a bolometric detector, use a resistance element made up of electrodes and a sensitive material which is referred to as a bolometric material,
and means of reading electrical signals provided by the thermometric means.

The means of absorbing the radiation and the thermometric means are integrated in a membrane which is suspended, by thermal isolation means, above a substrate in which the means of reading are provided.

Detectors intended for infrared imaging are conventionally produced as a one- or two-dimensional array of elementary detectors, said array being "monolithic" or mounted on a substrate generally made of silicon which incorporates means of sequentially addressing the elementary detectors and means of electrical excitation and of pre-processing the electrical signals generated by these elementary detectors. This substrate and the integrated means are commonly denoted by the term "readout circuit".

In order to obtain an image using this detector, the radiation obtained from the scene is projected through suitable optics onto the array of elementary detectors and clocked electrical stimuli are applied via the readout circuit to each of the elementary detectors or to each row of such detectors in order to obtain an electrical signal that constitutes an image of the temperature reached by each of said elementary detectors. This signal is then processed to a greater or lesser extent by the readout circuit and then, if applicable, by an electronic device outside the package in order to generate a thermal image of the observed scene.

The essential difficulty of using bolometric detectors is the extremely small relative variation in their electrical resistivity that is representative of the local temperature variations of an observed scene compared with the average value of these resistances.

In fact, the physical laws of thermal emission in the infrared spectrum of the observed scene typically from 8 to 14 micrometers (equivalent to the transparency band of the terrestrial atmosphere in which bolometric detectors are usually used) result in a differential power dP on the detector's focal plane of the order of 50 µW/cm² when the temperature of the scene varies 1 K either side of 300 K. Determining this value is easily within the capabilities of those skilled in the art by applying the above-mentioned physical laws.

This estimate is valid for an f/1 optics, good transmission between the scene and detector and if the detector only receives a negligible amount of energy outside the specified wavelength band, for example and typically, if the package has a window that is transparent in this range and opaque below and beyond the stated limits.

Consequently, the variation in temperature $d\theta$ of a bolometer working at thermal equilibrium associated with an infrared power dP absorbed on its surface S is given by the following equation:

$$dT = Rth \cdot dP \tag{1}$$

where Rth is the thermal resistance between the sensitive part of the bolometer, the temperature of which rises due to the infrared radiation, and the isothermal substrate on which it is mounted.

Thus, for a bolometer of typical dimensions of the order of 30 µm×30 µm which represents a surface area of $9 \cdot 10^{-6}$ cm², the typical thermal resistance according to the prior art is of the order of 20 to 60 MK/W which results in an increase in the temperature of the bolometer of the order of 0.01 K to 0.03 K if the temperature of the element of the scene observed by the bolometer varies by 1 K.

If $R_b$ is the electrical resistance across the two current input terminals on the sensitive bolometric material, the resulting variation in resistance $dR_b$ is expressed by the following equation:

$$dR_b = R_b \cdot TCR \cdot d\theta \tag{2}$$

where TCR is the relative coefficient of variation in resistance of the material that constitutes the sensitive part of the bolometer at around its operating temperature $\theta$. For the usual materials in this field (vanadium oxides, amorphous silicon), this coefficient TCR is approximately −2% per K. Consequently, the relative variation in resistance dR/R resulting from a difference of 1 K over the scene is therefore of the order of 0.04%, i.e. $4 \cdot 10^{-4}$/K.

Nowadays, thermal imaging resolutions much better than 1 K, typically 0.05 K or even less are required. Such results can be obtained by producing structures that have very high thermal resistances Rth by using sophisticated techniques. However, there remains the need to measure minute relative variations in resistance, typically—as stated earlier—of the order of $10^{-6}$ in order to resolve temperature variations in time and space of just a few dozen millikelvins.

Figure 1:
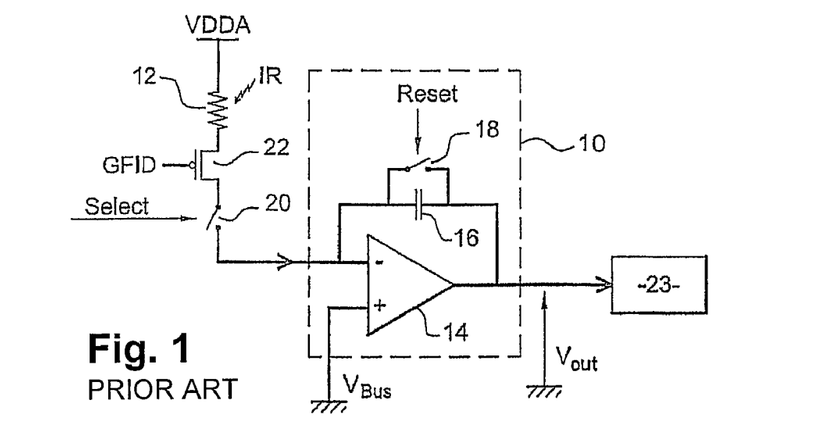
FIG. 1 is a schematic view of a sensitive bolometer and its readout device according to the prior art as discussed in the preamble.

In order to explain the difficulty of analyzing such a small variation, FIG. 1 shows a schematic view of a readout circuit. A predetermined constant bias voltage VDDA is applied to one of the terminals of a resistive bolometer 12 which has a resistance $R_b$ and is exposed to infrared radiation. The readout circuit comprises an integrator 10 which comprises:

an operational amplifier 14, the non-inverting input (+) of which is kept at a predetermined constant voltage VBUS;
a capacitor 16, having a predetermined capacitance $C_{int}$ and connected between the inverting input (−) of amplifier 14 and the output of the latter;
a reset switch 18 connected in parallel with capacitor 16 and controllable by means of a "Reset" signal.

The readout circuit also comprises:

a first read switch 20, controllable by means of a "select" signal and connected to the inverting input (−) of operational amplifier 14;

a MOS injection transistor 22, the gate of which is kept at a constant predetermined voltage GFID, the source of which is connected to the other terminal of bolometer 12 and the drain of which is connected to the other terminal of first read switch 20; and a data processing unit 23 which is connected to the output of operational amplifier 14 and determines the variation in the resistance of bolometer 12 caused by the infrared radiation received by the latter, and hence this infrared radiation, as a function of the voltage $V_{out}$ on the output of the operational amplifier.

At the start of a cycle to read bolometer 12, reset switch 18, which is closed following a cycle to discharge capacitor 16, is switched to the open state by adjusting the "reset" signal to an appropriate value. The first read switch 20 which is in the open state is switched to the closed state by adjusting the "select" signal. The current which flows through bolometer 12 is then integrated by capacitor 16. When a predetermined integration period $\Delta T_{int}$ has elapsed since the start of the readout cycle, the first read switch 20 is switched to its open state. The voltage $V_{out}$ on the output of this integrator, an image of the resistance of $R_b$ of the bolometer, is given by the equation:

$$V_{out} = \frac{V_{pol}}{R_b} \times \frac{\Delta T_{int}}{C_{int}} \quad (3)$$

where $V_{pol}$ is the bias voltage across the terminals of bolometer 12, assuming, for the sake of simplicity, that $R_b$ varies little throughout integration period $T_{int}$.

Thus, an array of N resistors (bolometers) can be read using this principle with the aid of simultaneous integration (by means of N integrators) or sequential integration (in an integrator at the end of a row or end of a column or even a single integrator for the array).

If the array thus produced is illuminated by projecting an infrared scene, $V_{out}$ will provide variations in space (obtained from each bolometer) representative of the scene. The reader is reminded that voltage $V_{out}$ as stated previously consists largely of a component that is constant from one detector to the other and which therefore has no relevance in terms of imaging.

Also, because there is thermal coupling between the substrate and the bolometer, the thermal variations to which the substrate is subjected have an effect on the bolometer. Because conventional bolometers are extremely sensitive to such variations, this stray current component interferes with the output signal and this has an adverse effect on the quality of infrared radiation detection.

Collectively, these components, namely the constant part of $V_{out}$ and the above-mentioned interference due to the substrate, which are contained in the signal $V_{out}$, are usually called the "common mode" signal.

Finally, reading a bolometer causes an electrical current to flow through it. The temperature of the bolometer therefore rises due to the Joule effect (this is usually called "self-heating"), thus adding more interference which disturbs the wanted signal associated with the scene. This self-heating $\Delta\theta(t)$ is a function of time and can be determined by using the following differential equation:

$$C_{th} \times \frac{\partial \Delta\theta(t)}{\partial t} = \frac{V_{pol}^2}{R_b(\theta(t))} - \frac{\Delta\theta(t)}{R_{th}}$$

where $C_{th}$ is the heat capacity of the sensitive membrane.

For a very short integration time $T_{int}$ of the order of a few dozen microseconds after applying voltage $V_{pol}$ at t=0, this increase in temperature can be considered to be linear and is given by the equation:

$$\Delta\theta = \frac{V_{pol}^2}{C_{th} \times R_b(\theta(t=0))} T_{int}$$

It would appear that, for typical values of $C_{th}$, $R_{th}$, $V_{pol}$ and $T_{int}$, this increase in temperature due to self-heating is typically as much as several degrees Kelvin. Thus, even though they are very limited, e.g. roughly 1%, variations in $C_{th}$ or $R_b$ in space which are inherent in the technology result in spatial temperature variations of each membrane at the end of an integration time of approximately 20 mK for an electrical temperature increase $\Delta\theta$ of 2°, i.e. of the same order as the temperature increase caused by a 1 K increase in the scene temperature.

These variations also interfere with the representativeness of signal $V_{out}$ compared with the variations in radiant flux in space and in time which are alone representative of the observed scene and constitute the wanted signal.

A so-called "reference" resistive structure described in the document entitled "Performance of 320×240 Uncooled Bolometer-type Infrared Focal Plane Arrays" by Yutaka Tanake et al., Proc. SPIE, vol 5074 has been proposed in order to overcome these drawbacks.

The principle of such a reference resistive structure is to associate a second identical resistive bolometer, which is biased and connected identically to the first bolometer, with the resistive bolometer 12 in FIG. 1. The second bolometer is also designed to be essentially insensitive to the flux obtained from the scene, typically by providing an opaque metallic membrane. The first and second resistive bolometers are also associated so that the current that flows through the second bolometer is subtracted from the current that flows through the first bolometer and it is this differential current that is used by the readout circuit.

In order to distinguish the functions of these two bolometers, the term "imaging bolometer" will be used to denote the first bolometer and the term "reference bolometer" will be used to denote the second bolometer even though, in certain applications such as thermometry for example, an image is not necessarily produced and a temperature measurement, for instance, is made.

Figure 2:
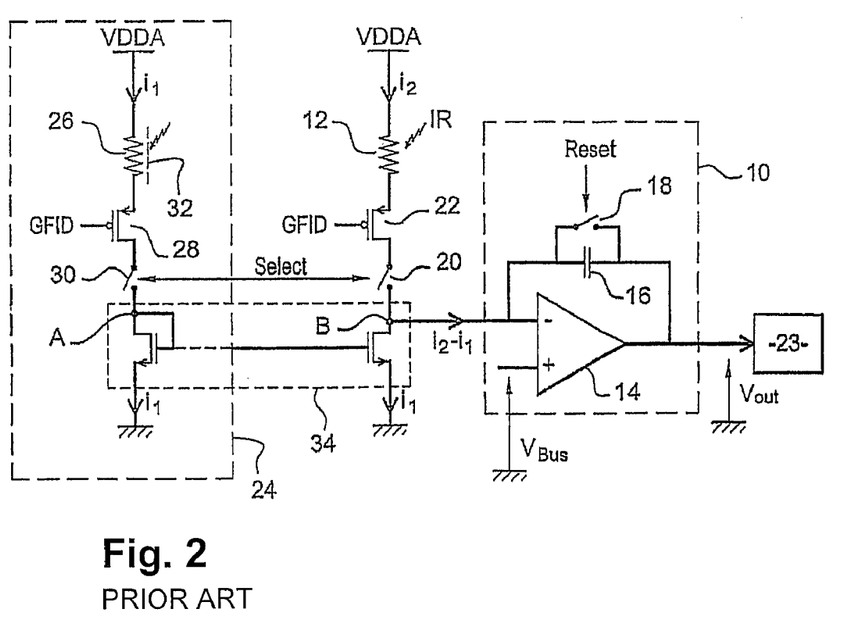
FIG. 2 is a schematic view which supplements FIG. 1 by showing common mode compensation by means of a resistive reference structure according to the prior art and associated circuitry components as discussed in the preamble.

A reference structure 24 is schematically shown in FIG. 2; this includes the components as in FIG. 1 and "reference" circuit 24 is associated with these. Reference circuit 24 comprises reference bolometer 26, MOS bias transistor 28 and a second read switch 30 which are, respectively, substantially identical to imaging bolometer 12, MOS injection transistor 22 and first read switch 20.

Components 26, 28 and 30 are, moreover, biased and designed the same way as components 12, 22 and 20, apart from the fact that reference bolometer 26 has an opaque metallic membrane 32 which protects it against radiation originating from the scene.

Finally, the resistive reference structure comprises a current mirror 34, one input leg of which is connected to terminal A of second read switch 30 and the other input leg of which is connected to terminal B of first read switch 20. This current mirror 34 substantially reproduces the current $i_1$ that flows through reference bolometer 26 on terminal B.

Using current mirrors makes it possible to have only a single reference structure per row with all these structures being arranged in a reference "column" for a matrix detector. Current mirrors are structures that are familiar to those skilled in the art. Generally speaking, they make it possible to copy a reference current from a remote structure and, in particular, to distribute this reference current to a multitude of circuitry components, regardless of their resistive load.

Thus, the current $i_1$ that flows through the reference bolometer is substantially equal to the common mode current and the reference bolometer and the imaging bolometer are both subjected to the same thermal variations originating from the substrate. The difference $i_2-i_1$ between current $i_2$ that flows through the imaging bolometer and current $i_1$ that flows through the reference bolometer is then substantially unaffected by interference consisting of the common mode current and the component associated with thermal variations of the substrate, at least provided one can assume that the substrate is essentially isothermal. This differential current $i_2-i_1$ therefore corresponds substantially to the current produced by the variation in the resistance of imaging bolometer 12 due to the increase in its temperature caused by infrared radiation obtained from the scene.

There are two classic layouts that use reference bolometers.

Figure 3:
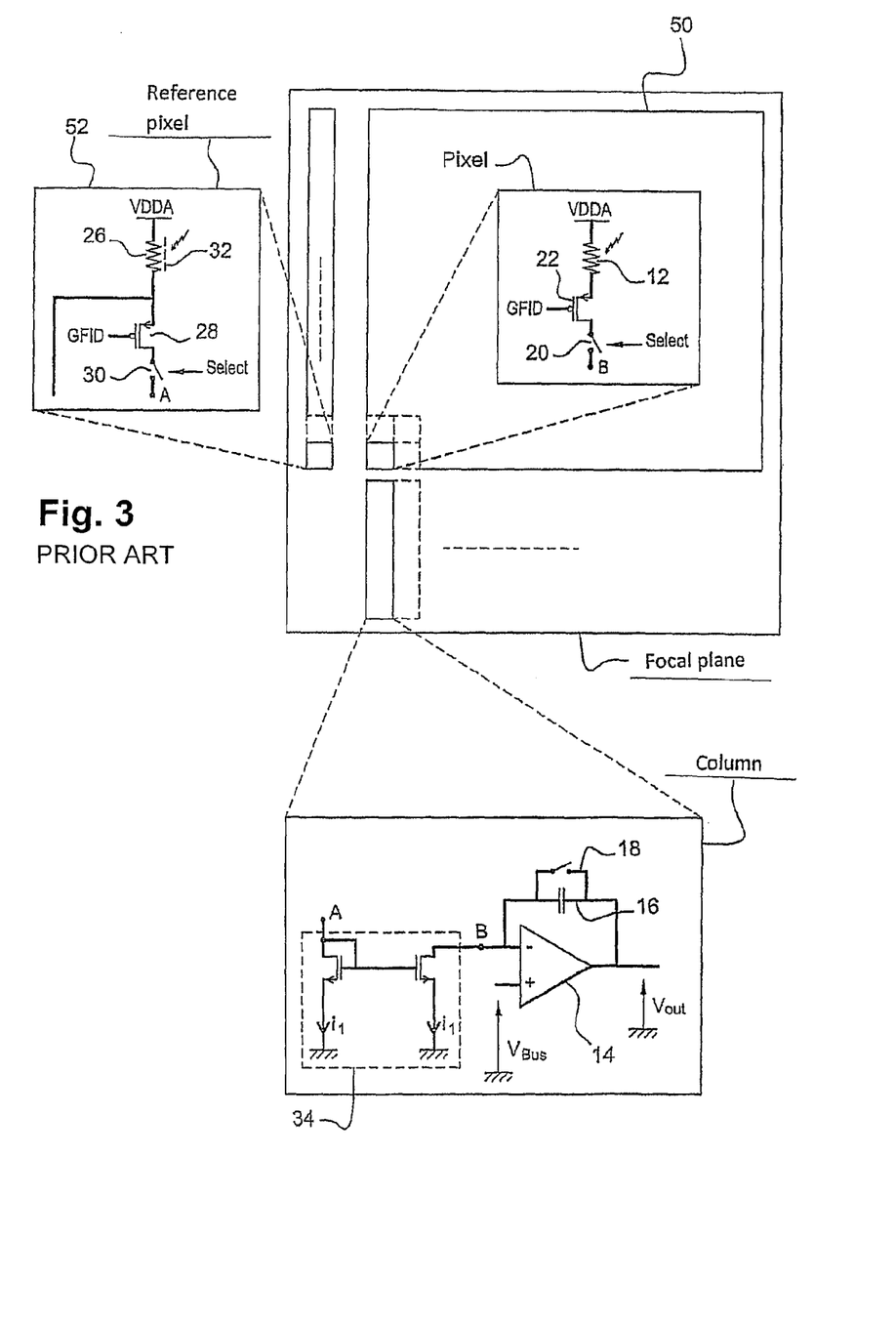
FIGS. 3 and 4 are schematic views of possible layouts of resistive reference structures in a bolometric detector.

In a first layout shown in FIG. 3, a reference bolometer 26 is provided for every row in array 50 of imaging bolometers and therefore supplies, via current mirror 34, a so-called "reference" current for all the imaging bolometers in the row. The self-heating phenomena that affect imaging bolometers 12 are therefore compensated because reference bolometer 26 is subjected to the same bias cycles as imaging bolometers 12 in the associated row. On the other hand, providing a reference bolometer 26 for every row of the array of imaging bolometers generates spatial noise on that row because of the technological dispersions associated with reference bolometers.

Figure 4:
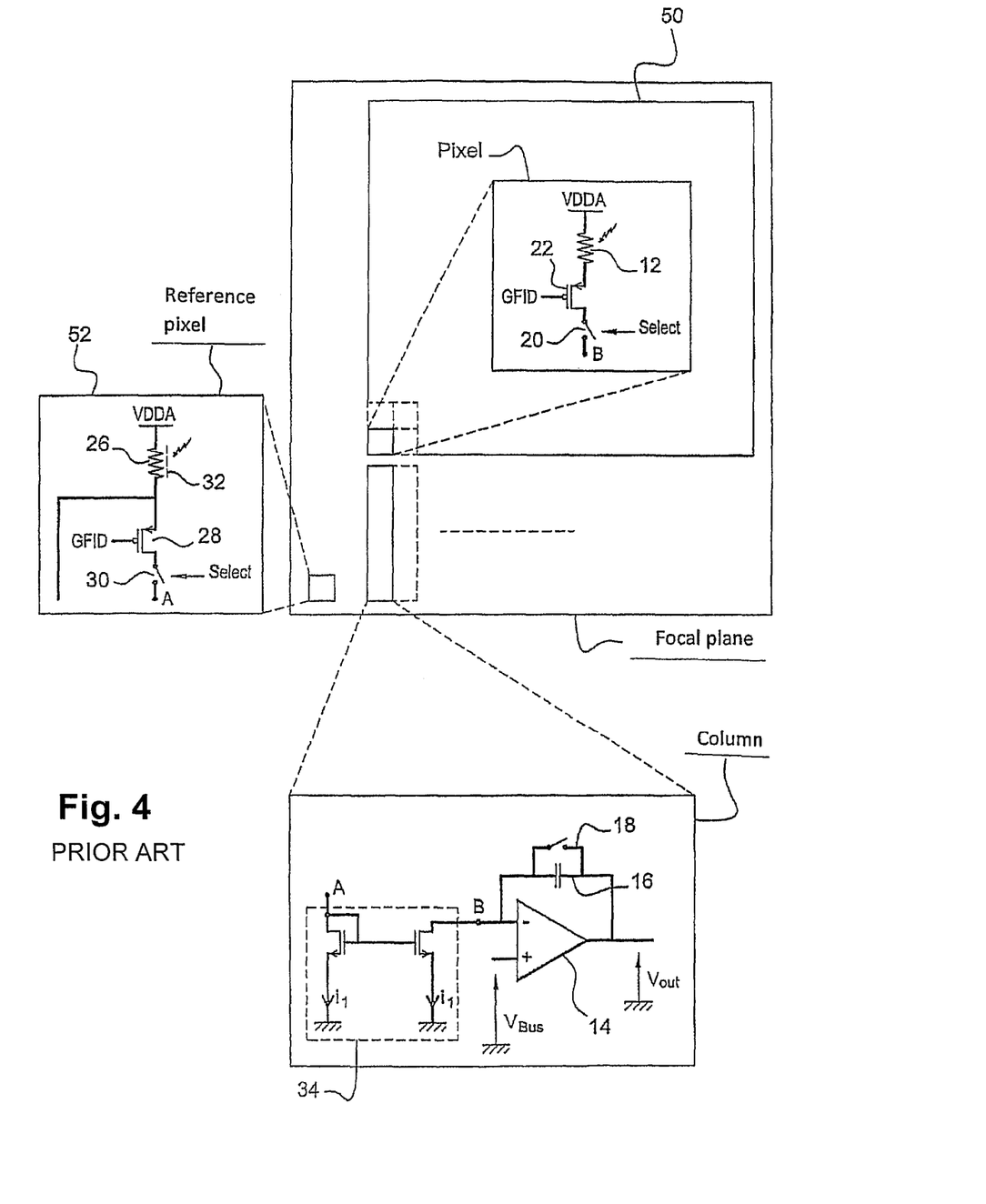

In a second layout shown in FIG. 4, just a single reference bolometer 26 is provided for all the imaging bolometers in array 50. The current output by the latter is then copied by a set of current mirrors 34. This avoids the spatial noise produced by technological dispersions. Nevertheless, the thermal cycle of this single reference bolometer 26 is substantially different to that of imaging bolometers 12. In fact, unlike an imaging bolometer which is biased when its row is read, reference bolometer 26 is biased every time a row is read. The thermal time constant of the reference bolometer $R_{th}.C_{th}$ of around several milliseconds does not allow it to return to its equilibrium temperature before each read (integration) cycle starts. Consequently, the reference bolometer starts the next integration cycle with a different initial resistance value. As a result, after a certain number of read cycles, self-heating of reference bolometer 26 differs substantially from the self-heating of imaging bolometers 12 so that rejection of this component is very mediocre.

Note that self-heating phenomena become more marked the more effectively the membranes of imaging bolometers 12 are isolated; this is the case in top of the range detectors where attempts are made to maximize $R_{th}$ in order to maximize sensitivity, and this also leads to $C_{th}$ being reduced in order to maintain a thermal time constant which is compatible with imaging frame frequency standards. Because of this, the temperature increase after each read operation becomes greater for comparable stimuli and ultimately the residual increase in temperature at the start of the next cycle is even more critical.

Common mode current rejection therefore becomes more awkward the more sensitive the detector is and, ultimately, this limits the performance improvements which can be made to these detectors.

Besides this, a resistive reference structure is technically difficult to produce. In fact, to obtain satisfactory operation of such a structure, metallic membrane 26 which protects the reference bolometer must be totally impermeable to the flux originating from the scene and it must be thermally isolated from the other elements of the structure in order to prevent the reference bolometer being affected by any thermal interference. Such a membrane is difficult to design and produce. In addition, the significant complexity introduced by fabricating such a membrane necessarily involves additional cost due to additional fabrication processes and the fact that production yields are not ideal.

SUMMARY OF THE INVENTION

The object of the present invention is to solve the abovementioned problems by proposing a common mode rejection and self-heating compensation structure of simple design which does not generate any spatial noise.

To achieve this, the object of the invention is a device for detecting electromagnetic radiation comprising:
- a resistive bolometer,
- a biasing circuit capable of biasing said bolometer with a predetermined bias voltage,
- a rejection module capable of generating a common mode current,
- and a measuring circuit capable of being connected to the bolometer and the rejection module in order to measure the difference between the current flowing through the bolometer when it is biased and the common mode current generated by the rejection module.

According to the invention, the rejection module comprises:
- a module for estimating a current that flows through the resistive bolometer when it is subjected to the bias voltage and made insensitive to the electromagnetic radiation that is to be detected;
- a current generator which is controlled by the estimation module and generates the current estimated by the latter as a common mode current.

In other words, the reference bolometer according to the prior art is replaced by an electronic structure which synthesizes the unwanted portion of the current output by the imaging bolometers which is valid regardless of the thermal and radiant conditions and regardless of the imaging-bolometer addressing frequency, so that it can be subtracted from the current obtained from the bolometers.

The thermal behavior of a bolometer, especially that of a membrane which is suspended above a substrate by support arms, is known to be complex. Conventionally, this behavior can actually be modeled by differential equations which have no analytic solution.

As stated above, the wanted signal included in the measurement is very small. In fact, as described above, the relative variation in the resistance dR/R of an imaging bolometer resulting from a difference of 1 K across the scene is usually around 0.04%, i.e. $4.10^{-4}$/K. At first sight, replacing a reference bolometer by an estimate which is a source of inaccuracy appears to be inappropriate.

However, considerable gains in terms of accuracy and flexibility in other respects are realized by so doing.

Firstly, using an estimate makes it possible to overcome the problem of technological dispersion which is encountered when several reference bolometers are used. The current estimation used is the same for all the imaging bolometers.

The estimation used makes it possible to overcome the problem of residual self-heating which is encountered when a single reference bolometer is used. Estimation actually makes it possible to simulate, for any read cycle, self-heating of an imaging bolometer. The rejection circuit according to the invention can thus be regarded as a "reference bolometer" whose resistance is initialized, before each read cycle, to a reference value which corresponds to the value which the imaging bolometer would have if it were made insensitive to the flux from the scene at the initial incident of every integration cycle. This "reference bolometer" therefore experiences the same self-heating cycles as an imaging bolometer regardless of the thermal characteristics of the imaging bolometers and the frequency at which they are addressed in a way which achieves effective rejection of this phenomenon.

This rejection capability is not available to "natural" reference bolometers according to the prior art because residual increases in temperature which are a memory of previous addressing cycles cannot be erased given the prior state of the art.

Finally, the estimation used is intrinsically insensitive to radiant flux because it is obtained by calculation; this eliminates the need to provide a screen which is opaque to radiation of the kind required by reference bolometers consisting of actual bolometric structures and this reduces the cost of fabricating the detector considerably.

According to one particular embodiment of the invention in which the bolometer comprises a membrane suspended above a substrate intended to be positioned in the focal plane of an optic, the estimation module comprises:
- at least one thermal sensor capable of measuring a temperature of the substrate,
- a module for calculating the common mode current as a function of the measured temperature of the substrate and a thermal model of the resistive bolometer.

In other words, if the temperature of the substrate is known, it is possible to estimate the common mode current.

The object of the invention is also a detector which comprises an array of resistive bolometers, each of the bolometers being associated with a biasing circuit capable of biasing said bolometers with a predetermined bias voltage, a rejection module capable of generating a common mode current, said current being copied to each of the columns by a current minor, and a measuring circuit capable of being connected to the bolometer and the rejection module in order to measure the difference between the current that flows through the bolometer when it is biased and the copy of the common mode current generated by the rejection module. According to the invention, associating the bolometer, the biasing circuit, the rejection module and the measuring circuit forms a device of the above-mentioned type.

BRIEF DESCRIPTION OF THE DRAWINGS

The invention will be made more readily understandable by the following description which is given merely by way of example and relates to the accompanying drawings in which identical references denote identical or analogous components and in which.

DETAILED DESCRIPTION OF THE INVENTION

Figure 5:
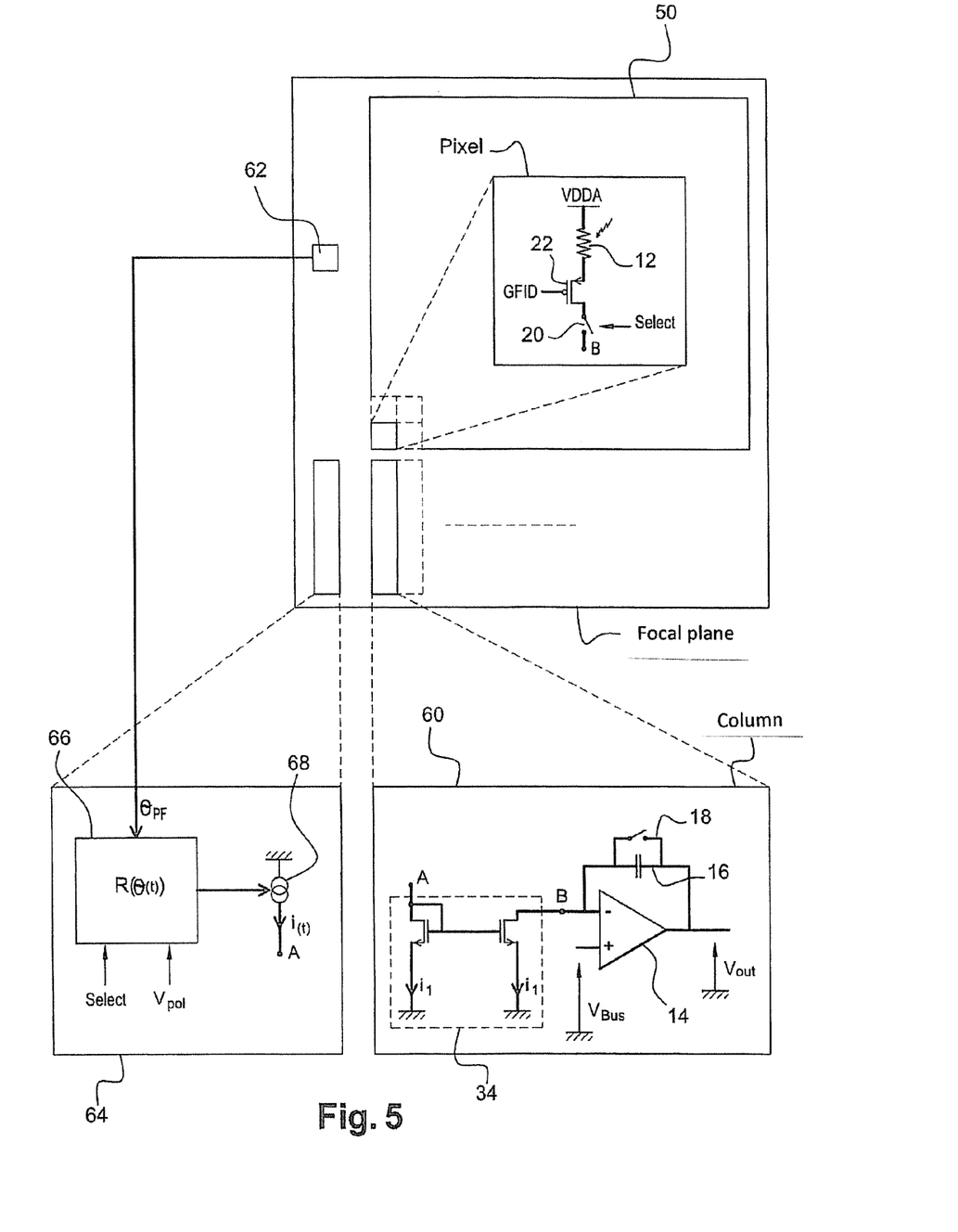
FIG. 5 is a schematic view of a bolometric detector in accordance with the invention.

A bolometric detector according to the invention is shown in FIG. 5. As described earlier in relation to FIGS. 2 to 4, the detector comprises an array of bolometric pixels 50; each of the pixels comprises an imaging bolometer 12, a MOS transistor 22 and a read switch 20. Every column in array 50 is associated with readout circuitry 60 implemented in a substrate positioned in the focal plane of optics (not shown) and underneath array 50. Circuitry 60 comprises an integrator formed by an operational amplifier 14, a capacitor 16 and a reset switch 18 as well as a current mirror 34.

According to the invention, the detector comprises a thermal sensor 62 which measures the temperature $\theta_{PF}$ of the focal plane and a common mode rejection module 64, which includes a digital estimation module 66 that is connected to thermal sensor 62.

Rejection module 64 comprises the digital estimation module 66 and a current generator 68 which is controlled by module 66 and connected to the first leg of the current mirrors 34 of circuitry 60.

Digital estimation module 66 receives the measured temperature $\theta_{PF}$ of the focal plane from the thermal sensor 62 and, on the basis of this measurement, estimates the change over time in the current of the resistor of an imaging bolometer 12 in array 50 if the latter is biased at a bias voltage $V_{pol}$ by MOS transistor MOS 22 and "sees" a reference thermal ambience such as that which might be produced, for example, by an opaque screen which is isothermal with the substrate. Note that bias voltage $V_{pol}$ is constant and known.

For example, if the sensitive material of the membrane of imaging bolometers 12 is a semiconductor type material (for instance amorphous silicon or vanadium oxide), digital estimation module 66 bases its estimates on the thermal model of the resistance of the imaging bolometer in accordance with the following equations:

$$C_{th} \times \frac{\partial \Delta \theta(t)}{\partial t} = \frac{V_{pol}^2}{R_b(\theta(t))} - \frac{\Delta \theta(t)}{R_{th}} + W(IR) \quad (4)$$

$$R_b(\theta(t)) = R_0 \times e^{\frac{E_a}{K \times \theta(t)}} \quad (5)$$

where:
t is time,
$R_{th}$ is the thermal resistance of the arms that support the membrane,
$C_{th}$ is the heat capacity of the bolometer,
$E_A$ is a predetermined activation energy of the bolometer,
K is Boltzmann's constant,
$R_0$ is the reference resistance of the bolometer when the temperature tends towards infinity,
$\theta(t)$ is the absolute temperature of the bolometer and $\Delta\theta(t)$ is the increase in its temperature relative to the substrate, $R_b(\theta(t))$ is the resistance of the bolometer.

W(IR) is the reference infrared incident flux power

For example, digital module 66 uses a software differential equation solver of a kind which is familiar in itself from the prior art.

Current generator 68 is controlled by digital estimation module 66 and then produces a current i(t) in accordance with the equation:

$$i(t) = \frac{V_{pol}}{R_b(\theta(t))} \qquad (6)$$

Common mode rejection circuit 64 then operates as follows:

When a row is selected in order to read the imaging bolometers in that row (switching of the "select" signal, closing of read switches 20 of that row and biasing of bolometers 12 by MOS transistors 22), the measurement of the temperature $\theta_{PF}$ of the substrate is stored by module 66 and the initial resistance $R_b(t=0)$ is calculated in accordance with the equation:

$$R_b(t=0) = R_0 \times e^{\frac{E_a}{K \times \theta_{PF}(t=0)}}$$

Digital estimation module 66 then estimates the variations over time in the resistance of imaging bolometers 12 by solving the system of equations (4) and (5). Current generator 68 generates the corresponding current i(t) which is then replicated in the second leg of current mirrors 34. Current i(t) is thus subtracted from each of the currents that flow through the imaging bolometers in the row which is being read, thereby achieving common mode rejection and compensating the imaging bolometers' self-heating.

According to one advantageous version, the compensation current is calculated directly (without solving any equation) as a function of time, typically in polynomial form. The adapted polynomial is obtained on the basis of linearly approximating equations 4 and 5. This version is especially apposite if the integration period is very short and allows very significant savings in terms of computing time and computing resources.

The digital estimation module 66, using computing resources and digital processing to form the reference current has the advantage of flexibility compared with the prior art because it is possible to adjust storage of the estimation parameters which are used by the estimation module in a memory which may or may not be integrated in the substrate.

This invention has applications in the field of image or thermometric sensors that utilize bolometric detection, regardless of the detection frequency band or the type of bolometric material used to fabricate the imaging bolometers and reference bolometers, e.g. amorphous silicon (a-Si), vanadium oxides (VOx) or metal (Ti).

Similarly, this invention has applications in infrared pyrometry, vehicle driver assistance systems which detect pedestrians by infrared imaging, infrared spectrometry, infrared gas measurement and, more generally speaking, physical measurements based on resistive bolometers.

The invention claimed is:

1. A device for detecting electromagnetic radiation comprising:
a resistive bolometer comprising a membrane suspended above a substrate,
a biasing circuit capable of biasing said bolometer with a predetermined bias voltage,
a rejection module capable of generating a common mode current, comprising:
an estimation module for estimating current that flows through the resistive bolometer when it is subjected to the bias voltage and made insensitive to the electromagnetic radiation; and
a current generator which is controlled by the estimation module and generates the current estimated by the latter as a common mode current, and
wherein the estimation module comprises:
at least one thermal sensor measuring a temperature of the substrate; and
digital processing means for calculating the common mode current as a function of the measured temperature of the substrate and a thermal model of the resistive bolometer;
a measuring circuit capable of being connected to a bolometer and to the rejection module in order to measure the difference between the current flowing through the bolometer when it is biased and the common mode current generated by the rejection module.

2. A bolometric detector comprising:
an array of resistive bolometers, each of the bolometers comprising a membrane suspended above a substrate and being associated with a biasing circuit capable of biasing said bolometer with a predetermined bias voltage,
a rejection module capable of generating a common mode current,
wherein the rejection module comprises:
an estimation module for estimating a current that flows through the resistive bolometers when subjected to the bias voltage and made insensitive to the electromagnetic radiation, and
a current generator which is controlled by the estimation module and generates the current estimated by the estimation module as a common mode current, and
wherein the estimation module comprises:
at least one thermal sensor measuring a temperature of substance;
digital processing means for calculating the common mode current as a function of the measured temperature of the substrate and a thermal model of the resistive bolometer; and
a measuring circuit capable of being connected to bolometer and the rejection module in order to measure the difference between the current that flows through the respective bolometer when it is biased and the common mode current generated by the rejection module.

3. The bolometric detector as claimed in claim 2, wherein the estimation module supplies a common mode current value which is representative of the self-heating of a bolometer which is subjected to a bias voltage during its measurement cycle.

4. The bolometric detector as claimed in claim 3, wherein the estimation module uses a simplified linear model of differential equations which describe variations in the current of the bolometer due to the effect of biasing during its measurement cycle.

5. The bolometric detector as claimed in claim 2, wherein the biasing circuit, the measuring circuit, the thermal sensor and the current generator are formed in the substrate.

6. The bolometric detector as claimed in claim 2, wherein the current supplied by rejection module is copied to each row by the array of bolometers by a current mirror formed in the substrate.

7. The bolometric detector as claimed in claim 6, wherein the estimation module is formed in the substrate.

8. The bolometric detector as claimed in claim 7, wherein the parameters which the estimation module needs are stored in memory formed in the substrate.

9. The bolometric detector as claimed in claim 2, wherein the estimation module calculates the common mode current in accordance with the following equations:

$$C_{th} \times \frac{\partial \Delta \theta(t)}{\partial t} = \frac{V_{pol}^2}{R_b(\theta(t))} - \frac{\Delta \theta(t)}{R_{th}} + W(IR)$$

$$R_b(\theta(t)) = R_0 \times e^{\frac{E_a}{K \times \theta(t)}}$$

$$i(t) = \frac{V_{pol}}{R_b(\theta(t))}$$

where:
t is time,
i(t) is the common mode current;
$R_{th}$ is the thermal resistance of arms that support themembrane of the bolometer,
$C_{th}$ is the heat capacity of the bolometer,
$E_A$ is a predetermined activation energy of the bolometer,
K is Boltzmann's constant,
$R_0$ is the reference resistance of the bolometer when the temperature tends towards infinity,
$\theta(t)$ is the absolute temperature of the bolometer and $\Delta\theta(t)$ is the increase in the bolometer temperature relative to the substrate,
$R_b(\theta(t))$ is the resistance of the bolometer,
$V_{pol}$ is a bias voltage applied to the bolometer, and
W(IR) is the reference infrared incident flux power.

10. A device for detecting electromagnetic radiation as claimed in claim 1, wherein the estimation module calculates the common mode current in accordance with the following equations:

$$C_{th} \times \frac{\partial \Delta \theta(t)}{\partial t} = \frac{V_{pol}^2}{R_b(\theta(t))} - \frac{\Delta \theta(t)}{R_{th}} + W(IR)$$

$$R_b(\theta(t)) = R_0 \times e^{\frac{E_a}{K \times \theta(t)}}$$

$$i(t) = \frac{V_{pol}}{R_b(\theta(t))}$$

where:
t is time,
i(t) is the common mode current;
$R_{th}$ is the thermal resistance of arms that support the membrane of the bolometer,
$C_{th}$ is the heat capacity of the bolometer,
$E_A$ is a predetermined activation energy of the bolometer,
K is Boltzmann's constant,
$R_0$ is the reference resistance of the bolometer when the temperature tends towards infinity,
$\theta(t)$ is the absolute temperature of the bolometer and $\Delta\theta(t)$ is the increase in the bolometer temperature relative to the substrate,
$R_b(\theta(t))$ is the resistance of the bolometer,
$V_{pol}$ is a bias voltage applied to the bolometer, and
W(IR) is reference infrared incident flux power.

11. A method of operating a device for detecting electromagnetic radiation comprising a resistive bolometer, and a biasing circuit capable of biasing said bolometer with a predetermined bias voltage, wherein said resistive bolometer comprises a membrane suspended above a substrate, the method comprising:
subjecting the bolometer to the electromagnetic radiation;
applying a bias voltage to the bolometer in order to make a current flow through the bolometer;
generating a common mode current that is an estimation of a current that would flow through the bolometer subjected to the bias voltage if the bolometer was made insensitive to the electromagnetic radiation by:
measuring a temperature of the substrate,
calculating the common mode current as a function of the measured temperature of the substrate and a thermal model of the resistive bolometer, and
generating the calculated common mode current,
subtracting the generated common mode current from the current flowing through the bolometer, and
measuring the resulting difference between the current flowing through the bolometer and the generated common mode current.

12. The method of claim 11, wherein the calculation of the common mode current is done by solving the following equations:

$$C_{th} \times \frac{\partial \Delta \theta(t)}{\partial t} = \frac{V_{pol}^2}{R_b(\theta(t))} - \frac{\Delta \theta(t)}{R_{th}} + W(IR)$$

$$R_b(\theta(t)) = R_0 \times e^{\frac{E_a}{K \times \theta(t)}}$$

$$i(t) = \frac{V_{pol}}{R_b(\theta(t))}$$

where:
t is time,
i(t) is the common mode current;
$R_{th}$ is the thermal resistance of arms that support the membrane of the bolometer,
$C_{th}$ is the heat capacity of the bolometer,
$E_A$ is a predetermined activation energy of the bolometer,
K is Boltzmann's constant,
$R_0$ is the reference resistance of the bolometer when the temperature tends towards infinity,
$\theta(t)$ is the absolute temperature of the bolometer and $\Delta\theta(t)$ is the increase in the bolometer temperature relative to the substrate,
$R_b(\theta(t))$ is the resistance of the bolometer,
$V_{pol}$ is a bias voltage applied to the bolometer, and
W(IR) is the reference infrared incident flux power.

\* \* \* \* \*